United States Patent [19]
Bruno

[11] Patent Number: 4,492,664
[45] Date of Patent: Jan. 8, 1985

[54] PROCESS FOR THE CONTINUOUS FOAMING OF PLASTICS

[76] Inventor: Mellé Bruno, Via Lampugnano 144, I-20151 Milan, Italy

[21] Appl. No.: 455,580

[22] Filed: Jan. 4, 1983

[30] Foreign Application Priority Data

Jan. 18, 1982 [IT] Italy .............................. 67046 A/82

[51] Int. Cl.$^3$ ............................................. B29D 27/04
[52] U.S. Cl. .................................... 264/46.2; 264/51; 264/338; 264/DIG. 84; 425/817 C
[58] Field of Search ................. 264/DIG. 84, 46.2, 51, 264/338; 425/817 C

[56] References Cited

U.S. PATENT DOCUMENTS

| | | | |
|---|---|---|---|
| 3,906,068 | 9/1975 | Hanusa | 264/DIG. 84 |
| 3,984,195 | 10/1976 | Del Carpio | 264/46.2 X |
| 4,074,960 | 2/1978 | Dockray et al. | 264/DIG. 84 |
| 4,154,562 | 5/1979 | Tabler | 264/DIG. 84 |
| 4,343,164 | 9/1982 | Fujii et al. | 264/338 X |

Primary Examiner—Philip E. Anderson

[57] ABSTRACT

A process for the continuous foaming of plastics, especially polyurethane, of the type in which the foaming space is delimited by flexible material bands which are fed together with the bun of foamed material being formed. As flexible material for these bands a composite web is used which comprises a support paper band and a thin impermeable band of plastics, preferably polyethylene having a thickness from 5 to 40 microns. The two bands of which the flexible is composed have a reduced adhesion to one another. The paper band is then detached from the bun of foamed material by disengaging it from the band of plastics which is left permanently adherent to the foamed material or is detached from this latter in an operation subsequent to the detachment of the paper band. In this way, losses of material are avoided, and the paper of the paper bands can be recovered.

9 Claims, 9 Drawing Figures

PROCESS FOR THE CONTINUOUS FOAMING OF PLASTICS

BACKGROUND OF THE INVENTION

This invention relates to a process for the continuous foaming of plastics, especially, but not exclusively, for the production of blocks of foamed polyurethane and the like.

In said processes, the mixture of starting materials intended to react and to foam is poured onto a flexible material band advancing on a belt conveyor, defining the base of the blocks to be produced, and bent in a vertical direction to define the sides of the blocks, or accompanied by separate bands defining said sides, which band, in some cases, is further accompanied by another band which defines the upper surface of the blocks, These bands delimit the space in which the foaming of the reacting mixture takes place and thus define the shape in which the mixture solidifies. As soon as a sufficient solidification is attained, said flexible bands are detached from the material which still advances in a continuous manner, and then this latter is cut into blocks of desired dimensions which are transferred onto special shelvings where the reactions being carried out are completed. Usually, the bands used for the purpose specified hereinabove are bands of paper. Although the paper is treated in a special manner to limit its permeability, considerable amounts of the mixture poured are absorbed by the paper and are then removed together with the paper, with the double disadvantage of giving rise to a waste of material and to a pollution of the paper, which therefore cannot even be used as paper pulp in paper mills and consequently involves disposal problems. In the cases in which the conveyor belt is heated to reduce the thickness of the unfoamed skin which forms at the base of the blocks, the skin can achieve such an adhesion to the paper as to give rise to peeling of the skin from the block at th moment of removal of the paper, thus resulting in a further waste of material. Also, under certain circumstances a sweating of substances through the paper takes place, resulting in fouling the installations.

To remedy these disadvantages, attempts have been made to use impermeable bands, for example of polyethylene, instead of the paper bands, but the results do not appear to be satisfactory because of the insufficient stiffness of these bands; on the other hand, the recovery of the material of these bands, which is indispensable in view of their cost, involves considerable technical problems.

Attempts have also been made to superimpose onto a paper band coming from a coil, a relatively thin band of polyethylene coming from a separate coil, but it has turned out that, under conditions of industrial production, it is not possible to ensure that the thin band of polyethylene adheres flatly and without ripples to the underlying band of paper in spite of the stresses which are to be applied for making the bands advance.

BRIEF SUMMARY OF THE INVENTION

The object of this invention is to solve in a rational manner the problem of eliminating or reducing the disadvantages mentioned hereinabove which arise in the continuous production of foamed products.

This object is achieved according to the invention by the fact that in a process of foaming carried out in the presence of flexible bands intended to delimit the space in which the foaming takes place, the flexible bands used are formed by webs of composite material, made of a band of paper to which a very thin band of plastics adheres, and having a low adhesion between said two components; said composite web being disposed with its element of plastics turned towards the interior of the space delimited by the bands; and the band of paper being then removed from the foamed material formed by tearing it off from the band of plastics, which is left adherent to the foamed product formed.

Thanks to this way of carrying out the work a complete impermeability of the bands which delimit the foaming space is obtained, and therefore the paper band which is detached from the foamed product formed does not carry any trace of foamed material or of its components, thus systematically avoiding the loss of such materials and, in addition, allowing a complete recovery of the unpolluted paper. Even in the cases in which the temperature of the conveyor belt is raised in order to minimize the thickness of the skin which forms at the base of the foamed product, there is no danger of tearing off this skin when detaching the paper band. No sweating is possible and therefore any soiling of the installation is avoided.

According to a first way of carrying out the invention, the very thin band of plastics, which originally was coupled to the paper band and from which this latter has been detached, is left standing adherent to the corresponding surfaces of the formed foamed block, without giving rise, generally, to any disadvantage. In fact, the very thin band of plastics will subsequently be removed from the formed block, together with the layer of skin with which it is provided and which has to be cut away.

In a second way of carrying out the invention, instead, the band of plastics is detached in its turn from the formed foamed product, after the detachment of the paper band, and is collected separately from this latter and forwarded to recover.

The fact of using a composite web in which a paper band acts as a support for a very thin band of plastics, allows to limit by a very considerable extent the consumption of plastics due to the fact that it is possible to reduce to a minimum, for example in the order of a hundredth of a millimeter, the respective thickness, while a band having such a reduced thickness, not coupled to a paper band, could in no way be used in an industrial foaming installation. The adhesion between the two components of the composite web, though being reduced, ensures the perfect flatness of the inner band of plastics without requiring any particular precautions during the treatment of the composite web, as compared to an ordinary band of paper. The paper used in the composite web may be of a quality inferior to that which is employed usually, because no impermeability of the paper is required, thus allowing a reduction of the costs. The plastics included in the composite web may be selected from a large field of possibilities, and in particular it may be an economical polyethylene from which no particular properties are required. The composite web, as such, results in being economical inasmuch as it requested to exhibit a low adhesion between the components, whereas the difficulty which generally arises in the production of composite webs, and which is surmounted by means of operations which increase the costs, depends on the requirement of obtaining a higher adhesion between the components.

In its first embodiment, in which the band of plastics is left permanently adherent to the foamed product formed, the invention can be carried out in an ordinary foaming installation, without requiring any modification or adaptation of the installation, except the replacement of the reels of paper which are used commonly, by similar reels of composite web.

In the second embodiment, the application of the invention requires an adaptation of the usual installations, by doubling the means for moving the bands away from the formed foamed product, the first of said means carrying out the detachment and collection of the paper, and the second of said means carrying out separately the detachement and collection of the very thin band of plastics.

Provision could be made for detaching the composite web without separation of its components (in which case the initial requirement of using a composite web having a low adhesion would not exist), but this procedure results in being less convenient because it seriously hinders the successive recovery of the paper and plastics which remained coupled.

Of great practical importance is the fact that the invention is applicable without difficulty to foaming installations of all the various existing types. The invention may concern all or only a part of the bands used in an installation, the maximum advantage of the application of the invention being attained, obviously, in relation to the lower band onto which the reactive mixture is poured. Therefore, the invention may be applied to the single U-bent band which forms the base and the sides of the foaming space in the installations having a single band; or to the only base band or both to this latter and to the lateral bands in the installations with three bands; it may be applied to the upper band intended to render flat the upper surface of the block formed in the Hennecke and the Planiblock types of installations; it is compatible with the presence of the lateral bands of polyethylene, diverted upwards, in the installations of the Draka and the Petzetakis types, and obviously it may also be applied in the Maxfoam type installations, although in these installations the base band does not receive directly the reactive mixture, but an already foamy material which has reacted partially.

The invention can also find application both in the production of flexible foamed products and rigid foamed products, of the open cell or closed cell kind, and of different characteristics. The main field of application seems to be that of the foaming of polyurethane compounds, but it is intended that the invention can also be applied to the foaming of other synthetic materials having similar requirements.

BRIEF DESCRIPTION OF THE DRAWINGS

The particular features of the process according to the present invention will be more clearly apparent from the following description of some embodiments thereof, with reference to the annexed diagrammatic drawings, in which.

DETAILED DESCRIPTION OF PREFERRED EMBODIMENTS

Figure 1:
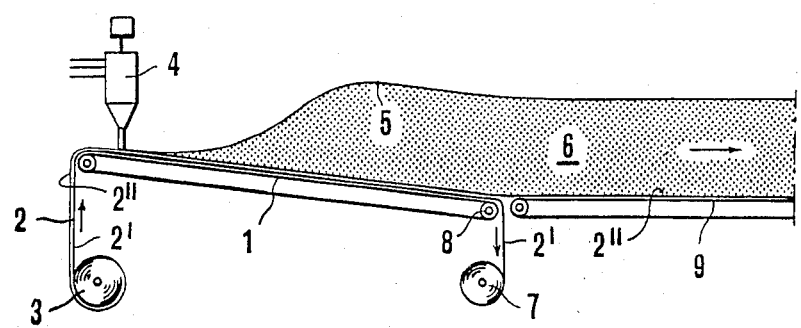
FIG. 1 shows the diagram of a conventional installation in which the invention is applied in a first embodiment wherein provision is made for the plastic material component of the composite web to remain adherent to the foamed blocks formed.

The diagram shown in FIG. 1 illustrates a conventional foaming installation, of which only the base band is taken into consideration. The installation comprises a first conveyor belt 1, slightly inclined downwards, onto which, upon interposition of a flexible band 2 coming from a reel 3, the reactive mixture formed in a mixing head 4 is poured. After a certain time has elapsed, and hence after having advanced on the belt conveyor 1 maintained in continuous motion, the mixture deposited begins to react and to foam, so that (since the space on the sides is limited by bands not shown) the foam which is being formed rises until it reaches at 5 its maximum level; then the solidification of the foamed material takes place.

Figure 7:
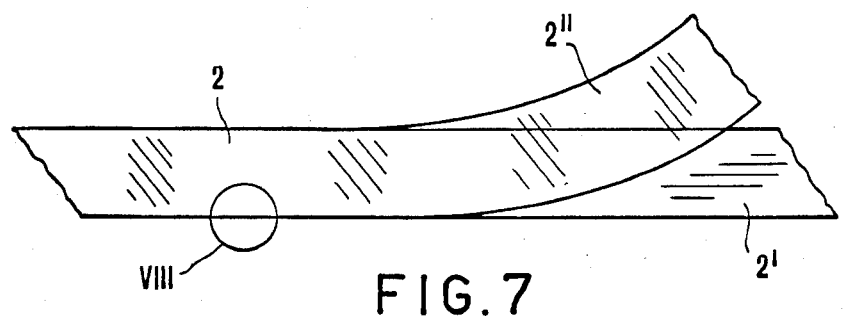
FIG. 7 shows a section of the composite web, having the component bands partially torn off from one another.
Figure 8:
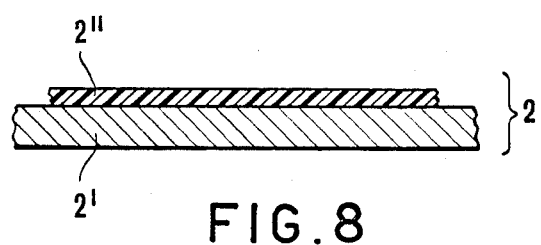
FIG. 8 shows on very large scale a cross section of the composite web.

According to this invention, the flexible band 2 is formed (FIGS. 7 and 8) by a composite web comprising a paper band 2' (which confers to the composite web a stiffness sufficient to ensure the flatness of the corresponding surface of the foamed material and to ensure a suitable handiness of the flexible band) and a very thin band of plastics 2" (which confers on the composite web a substantially complete impermeability). Advantageously, said band of plastics 2" may be a band of polyethylene having a thickness from 5 to 40 microns, or more preferably from 10 to 20 microns.

Said two components 2' and 2" of the composite web 2 are connected to one another in such a manner as to exhibit a limited mutual adhesion, sufficient to prevent any detachment during the manipulation of the composite web and during its use for limiting the foaming space, but such as to allow an easy intentional detachment of the two components from one another.

Figure 9:
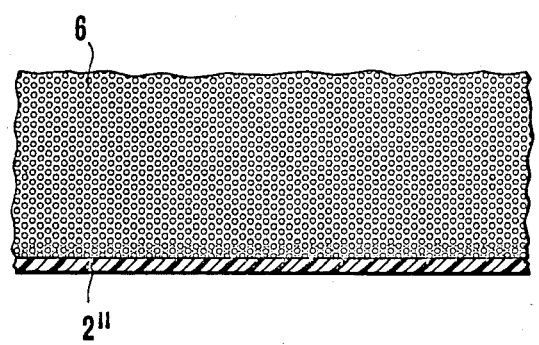
FIG. 9 shows on very large scale a portion of a foamed block having a plastics band adhered to its surface.

At a location in the installation, in which the foamed material 6 has already attained such a degree of solidification as not to require anymore the rigid support provided by the paper band 2' which is part of the composite web 2, the paper band 2' is detached from the band 2" of polyethylene which was attached to it precedently, and is collected in a reel 7. In the embodiment shown this takes place at the final intermediate roller 8 for the inclined belt conveyor 1. A successive belt conveyor 9 carries then further the foamed material 6, forming the so-called bun, having disposed thereon as a surface coating the band 2" of polyethylene which was a part of the composite web 2 (FIG. 9). Successively, the bun 6 will be cut into blocks and left to cure, as usual.

The point which the paper band 2' is detached from the band of polyethylene 2" may be substantially the same point at which, in a conventional installation, the uncoupled paper band is detached, or it may also be situated slightly nearer to the mixing head 4, taking into account that such detachment, in this case, does not involve any peeling action of the bun 6 and consequently may be carried out in the presence of a degree of solidification lower than that which is necessary to withstand a peeling action.

Figure 2:
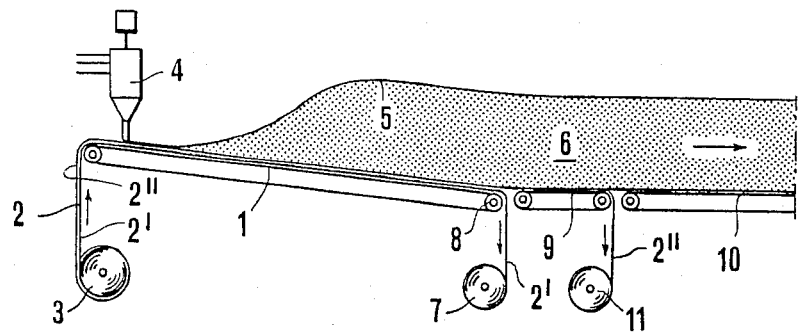
FIG. 2 shows a similar diagram for the case of application of the second embodiment of the invention, in which the plastic material component of the composite web is detached from the formed blocks too.

FIG. 2, which relates to the second example of application of the invention, shows parts which are identical with those shown in FIG. 1, indicated by the same reference numerals and not repeatedly described, and further illustrates the way in which, at the end of the belt conveyor 9 (which in this case is continued by a further conveyor 10), also the polyethylene band 2" left adherent to the bun 6 is detached and collected on a reel 11. This is carried out downstream from the point of detachment of the paper band 2' and at a point at which the bun 6 has attained a solidification such as to allow it to withstand the peeling action inherent in the detachment of the band 2" of polyethylene, which action, however, is very moderate owing to the impermeability of this band, which impermeability prevents any strong adhesion thereof to the bun 6.

Figure 3:
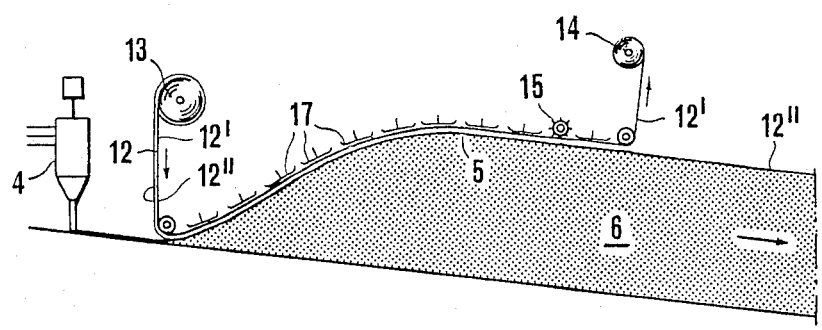
FIG. 3 illustrates the way in which the invention, in this case in its first embodiment, can be applied to the upper band in a process of the Hennecke or the Planiblock type.

FIG. 3 shows, in relation with the mixing head 4 and the bun 6, the characteristic parts of a Hennecke type installation, i.e. a flexible band 12, coming from a reel 13, which is guided by means of plates 17 along the upper surface of the material 6 which is being foamed, until it reaches a position beyond the point 5 at which the material attains its highest level, and is then withdrawn onto a reel 14, eventually after having been perforated at 15. In this case, the use of the invention involves that the band 12 be formed by a composite web of the same type as the web 2 mentioned before, and that on the reel 14 be collected only the paper band 12' of the composite web 12, by allowing the band of plastics 12" to remain adherent to the upper surface of the bun 6 and to continue its advancing movement.

Figure 4:
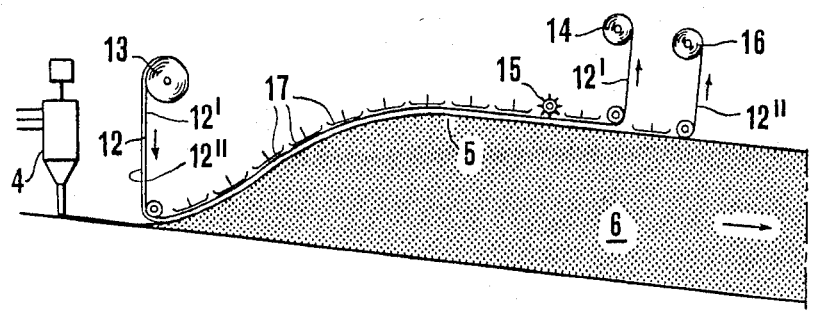
FIG. 4 illustrates the application of the invention, in its second embodiment, to the upper band in a Hennecke or a Planiblock process.

FIG. 4 illustrates the way in which the installation shown in FIG. 3 has to be modified when one desires to use the invention in its second embodiment. In this case, also the band of polyethylene 12" left adherent to the upper surface of the bun 6 is withdrawn, at a point situated downstream from the point at which the paper band 12' collected on the reel 14 has been withdrawn. The plastics band 12", in its turn, is wound to form a reel 16.

Figure 5:
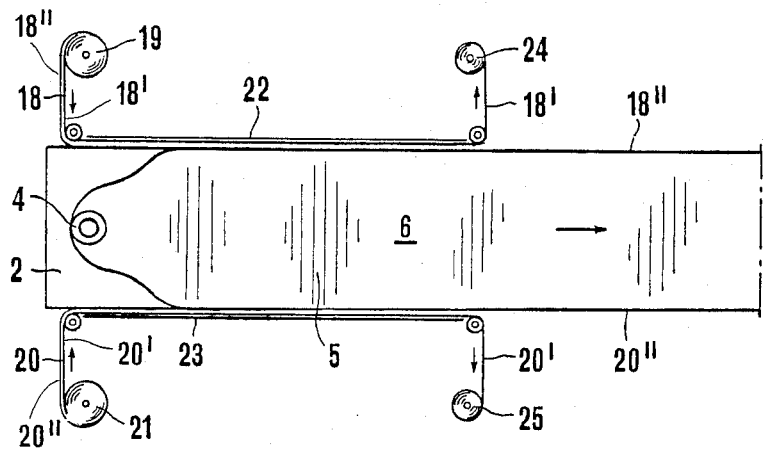
FIG. 5 is a plan view illustrating the application of the invention to the lateral bands of a three band type installation, in its first embodiment.

FIG. 5 illustrates the way in which the invention, in its first embodiment, can be used in relation with the lateral bands of a foaming installation. In the diagram of FIG. 5 the installation is shown in a plan view; the mixing head 4 pours the reactive mixture onto the flexible band 2 which covers the base conveyor belt, which mixture is made to foam and to form the bun 6. The foaming space is laterally limited by walls 22 and 23 inside which slide the flexible bands 18 and 20 coming from reels 19 and 21. According to the invention, these flexible bands 18 and 20 are formed by composite webs of paper (18', 20') and thin plastics (18", 20"), and the paper bands 18', 20' are withdrawn, after the solidification of the foamed material 6, by detaching them from the respective bands of plastics 18", 20" which remain adherent to the side surfaces of the bun 6, while the paper bands 18', 20' are collected on reels 24 and 25, respectively.

Figure 6:
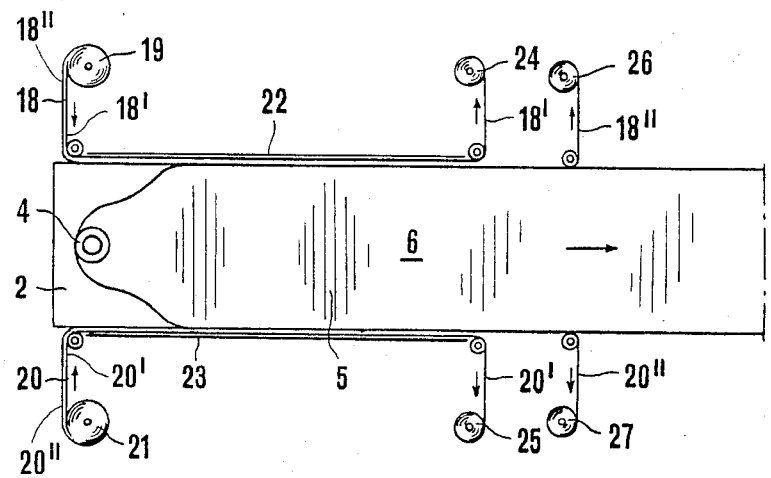
FIG. 6 similarly illustrates the application of the second embodiment of the invention to the lateral bands of an installation.

Also in relation with the lateral bands the present invention can be applied in its second embodiment, as shown in FIG. 6. In this case, also the bands of plastics 18", 20" left adherent to the side surfaces of the bun 6 are withdrawn, at positions situated downstream from those in which the paper bands 18', 20' collected on the reels 24 and 25 have been withdrawn. The plastics bands 18", 20", in their turn, are wound onto reels 26 and 27, respectively.

Although in the foregoing description the use of the invention, in its various embodiments, has been described separately for the base band 2, for the upper band 12 and for the lateral bands 18 and 20, it is to be understood that the various arrangements described and illustrated can coexist, that is to say that in a real installation with a plurality of flexible bands the invention can be used with all the bands, with a part of them or even with only one of them, in conformity with the operational opportunities of each single case.

What is claimed is:

1. In a process for the continuous foaming of plastics, comprising the steps of pouring a foaming mixture into a foaming space, of letting said mixture foam and solidify in said foaming space, of limiting said foaming space by means of flexible bands and of guiding and moving said flexible bands so as to follow the corresponding surfaces of the material being foamed and solidified, the improvement that as flexible band a composite web is used, which is formed by a support paper band and a very thin impermeable band of plastic material detachably coupled to said paper band and disposed between said paper band and said material being foamed and solidified.

2. A process as claimed in claim 1, wherein said composite web, used as flexible band, has a lesser adhesion between said band of paper and said band of plastic material of which it is composed than the adhesion between said band of plastic material and said foamed and solidified material, and comprising the step of detaching the paper band of the flexible band from the formed foamed material by disengaging said paper band from the band of plastic material, which is left adherent, at least temporarily, to the foamed material.

3. A process as claimed in claim 2, wherein said band of plastic material is left permanently adherent to the formed foamed material.

4. A process as claimed in claim 2, comprising the step of detaching the band of plastic material from the foamed material, in a stage subsequent to the detachment of the paper band.

5. A process as claimed in claim 1, wherein said very thin band of plastic material is made of polyethylene having a thickness from 5 to 40 micron.

6. A process as claimed in claim 5, wherein said very thin band of plastic material is made of polyethylene having a thickness from 10 to 20 micron.

7. A process as claimed in claim 1, particularly applied to the manufacture of blocks of foamed polyurethane.

8. A process as claimed in claim 1, particularly applied to the manufacture of blocks of foamed polyurethane having at least a part of their surfaces coated with a very thin sheet of adherent plastic material.

9. A process as claimed in claim 2, and continuously unrolling said composite web from a reel of the same, and continuously feeding said unrolled web to said foaming space.

* * * * *

UNITED STATES PATENT AND TRADEMARK OFFICE
CERTIFICATE OF CORRECTION

PATENT NO. : 4,492,664
DATED      : January 8, 1985
INVENTOR(S): Bruno Melle

It is certified that error appears in the above-identified patent and that said Letters Patent is hereby corrected as shown below:

On the title page, Item (76) Inventor: "Melle Bruno" should read --Bruno Melle--.

Signed and Sealed this

Twentieth Day of August 1985

[SEAL]

*Attest:*

DONALD J. QUIGG

*Attesting Officer*   *Acting Commissioner of Patents and Trademarks*

UNITED STATES PATENT AND TRADEMARK OFFICE
CERTIFICATE OF CORRECTION

PATENT NO. : 4,492,664
DATED : Jan. 8, 1985
INVENTOR(S) : Bruno Melle

It is certified that error appears in the above-identified patent and that said Letters Patent is hereby corrected as shown below:

On the title page, Inventor's name: "Melle Bruno" should read
--Bruno Melle--.

Item [73] should be inserted to read:
--S.p.A. Giuseppe Olmo - Superflexite Italiana
Bergamo, Italy.--.

This certificate supersedes certificate of correction issued August 20, 1985.

*Signed and Sealed this*

*Eleventh* Day of *March 1986*

[SEAL]

*Attest:*

DONALD J. QUIGG

*Attesting Officer*   *Commissioner of Patents and Trademarks*